United States Patent [19]

De Oliveira

[11] Patent Number: 4,880,088
[45] Date of Patent: Nov. 14, 1989

[54] COLLISION PROTECTING SYSTEM FOR TLP STRUCTURES

[75] Inventor: Joao G. De Oliveira, Stavanger, Norway

[73] Assignee: Conoco Inc., Ponca City, Okla.

[21] Appl. No.: 268,394

[22] Filed: Nov. 7, 1988

[51] Int. Cl.$^4$ .................. F16F 7/12; B63B 59/02; E02D 5/60
[52] U.S. Cl. .................. 188/377; 114/219; 405/216
[58] Field of Search ............ 188/371, 377; 114/219; 405/212, 216; 293/133

[56] References Cited

U.S. PATENT DOCUMENTS

| | | | |
|---|---|---|---|
| 3,298,465 | 1/1967 | Stastny | 188/377 |
| 3,503,600 | 3/1970 | Rich | 267/116 |
| 3,541,800 | 11/1970 | Walker et al. | 114/219 X |
| 3,675,746 | 7/1972 | Irvine | 188/377 |
| 4,032,126 | 6/1977 | Laughlin et al. | 267/116 |
| 4,398,848 | 8/1983 | Guilbeau | 114/219 X |
| 4,423,802 | 1/1984 | Botzem et al. | 188/377 |
| 4,494,738 | 1/1985 | Britton et al. | 267/140 |
| 4,650,371 | 3/1987 | Sawaragi et al. | 114/219 X |

FOREIGN PATENT DOCUMENTS

| | | | |
|---|---|---|---|
| 0018213 | 9/1912 | United Kingdom | 188/371 |
| 2083162 | 3/1982 | United Kingdom | 188/371 |

Primary Examiner—Robert J. Oberleitner

[57] ABSTRACT

A light weight, energy dissipation bumper system for protecting the columns of an offshore platform. A plurality of rows of crushable tubes are provided to dissipate collision energy through absorption without storing such energy. The tubes have a diameter to thickness ratio between 30 and 40 for mild steel providing neutral/positive buoyancy. The tubes may be easily replaced when their ability to protect the column to which they are attached to exhausted through flattening. The tubes may extend either axially along or radially outward from the column.

13 Claims, 2 Drawing Sheets

COLLISION PROTECTING SYSTEM FOR TLP STRUCTURES

BACKGROUND AND SUMMARY OF THE INVENTION

The present invention relates to fenders for a relatively stationary offshore platform More particularly, the present invention is directed to a light weight, energy-dissipation bumper system for the columns of an offshore tension leg platform, or the like.

Many sophisticated (and, therefore, expensive) pile protector systems have been devised. Some of these have possible application on offshore platforms such as tension leg platforms, and the like. Among these bumper systems are those shown in U.S. Pat. Nos. 3,503,600 to Rich; 3,541,800 to Walker et al.; 4,032,126 to Laughlin et al.; 4,398,848 to Guilbeau; 4,494,738 to Britton et al.; and 4,650,371 to Sawaragi et al.

Besides being overdesigned and, therefore, not cost effective solutions, a number of these systems would impose undue weight penalties on the floating platform. While not all possible applications for these bumpers are weight sensitive, offshore platforms are particularly susceptible to considerations of weight. Indeed, ss a general rule, for each pound of weight positioned above the waterline, two pounds of structure are required below the waterline to support it. Hence, any bumper system utilized to protect the columns of an offshore platform that does not have weight considerations among its most significant design criteria, will not have satisfactory performance.

The energy-dissipation bumper system of the present invention has two principal design features: (1) light weight, and (2) simplicity, both of which precipitate low cost. First and second coaxial cylindrical shells sandwich a plurality of light-weight crushable tubes. These tubes absorb the energy of a potentially destructive collision solely by being crushed. Tubes which become so damaged as to inadequately protect the column structure to which they are attached can be easily replaced These tubes may either extend radially about the column or axially along the column in a plurality of rows. By preventing ingress of seawater into the bumper system, the hollow crushable tubular members actually provide buoyancy to the platform, as opposed to imposing a weight penalty.

Various other features advantages and characteristics of the present invention will become apparent after a reading of the following detailed description.

DETAILED DESCRIPTION OF THE PREFERRED EMBODIMENTS

Figure 1:
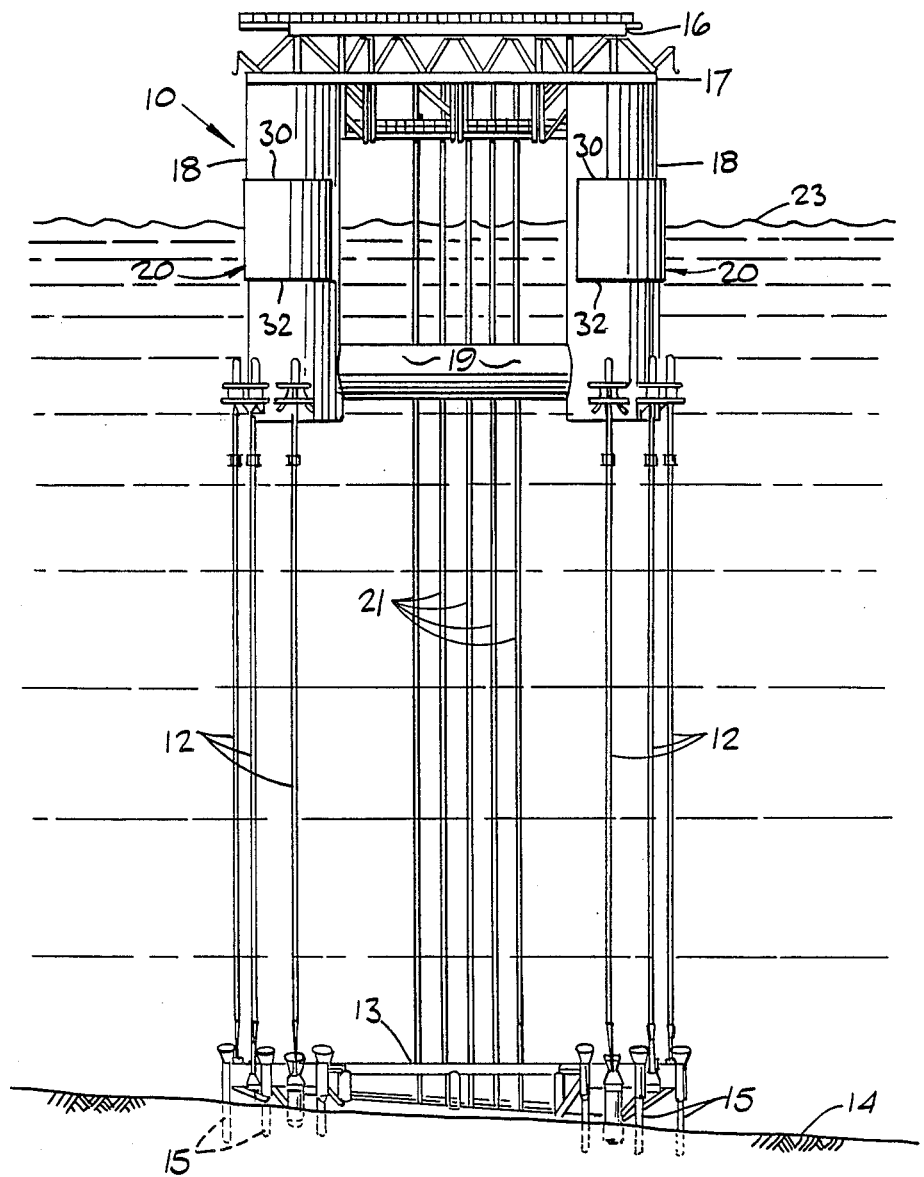
FIG. 1 is a diagrammatic side view of a tension leg platform utilizing the column protecting bumper system of the present invention.

A tension leg platform of the type with which the energy-dissipation bumper system of the present invention might be used is shown in FIG. 1 generally at 10. This floating drilling and production facility is moored to the sea floor 14 by means of tendons 12 which engage in receptacles formed on foundation template 13 Template 13 is secured to the ocean floor 14 by piles 15 which are driven, or otherwise secured, therein. Upper (16) and lower (17) decks are secured to a plurality of columns which are held together by pontoons 19. An axial portion of each column 18 adjacent a minimum water line 23 is protected from collision by ships, delivery boats, debris, etc., by an energy-dissipation bumper system 20 secured about a portion of the periphery thereof. It is preferred that the bumper system 20 protect a region from 20 feet below to 25 feet above water line 23. Production tubing inside of risers 21 connect subsea wells with wellheads on deck 17.

Figure 2:
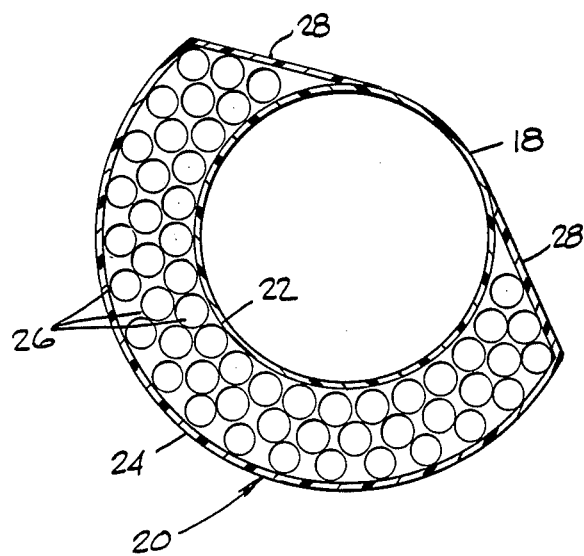
FIG. 2 is a cross-sectional top view of a column equipped with one embodiment of the bumper system of the present invention.

A first embodiment of the energy-dissipation bumper system 20 of the present invention is shown in greater detail in FIG. 2. Bumper system 20 is comprised of a first inner shell 22 with a first outer diameter and a second coaxial outer shell 24 with a second larger diameter. Sandwiched between shells 22 and 24 is a plurality of crushable thin-walled tubes 26 which extend substantially parallel to the axes of shells 22 and 24. As depicted in FIG. 2, each of the tubes 26 has the same outer diameter and wall thickness and the tubes 26 are deployed in a five spot pattern (i.e., adjacent rows are circumferentially offset). This configuration will permit some of the energy to be dissipated as friction resulting from positional readjustment of tubes 26 as a result of a collision with outer shell 24. However, the substantial majority of the collision energy will be dissipated (i.e., absorbed) by the collapse of the tubes as they are crushed under the load. While it would be possible for inner shell 22 to be the outer skin of column 18, it is preferred that a separate layer be used to form shell 22 to ensure the integrity of bumper 20 and ease of attachment.

The trailing edges 28 of bumper system 20 are tapered back into column 18 to minimize drag loading by wind and waves. A top (30) and bottom (32) panel completely enclose tubes 26 in a sealed compartment. Accordingly, the hollow tubes 26 can provide buoyancy to the bumper system 20. In fact, by properly selecting the proper wall thickness and diameter as well as length of tubing 26 that is submerged, for a selected material the bumper system 20 can be neutrally buoyant or even slightly positively buoyant. Thus, instead of imposing a weight penalty, the bumper system 20 of the present invention can fully support its own weight. For mild steel, the preferred material for constructing tubes 26, the diameter to wall thickness ratio must exceed 29.5 for neutral/positive buoyancy and preferably is in the range of from about 30 to about 40.

In the FIG. 2 embodiment, by way of example and not limitation, tubes 26 may have an outer diameter of 12 inches and a wall thickness of ⅜ inch. Preferably, tubes 26 would be constructed in five foot lengths with telescopically interconnecting ends to facilitate replacement of damaged sections without the need to scrap an entire tube length. Similarly, inner and outer shells 22 and 24, respectively, can be constructed to permit easy access as needed, for example, for repair/replacement of crushed tubes following a sufficient number of collisions to render the fender 20 incapable of adequately protecting column 18. Tack welds may be used between adjacent tubes 26 and between tubes 26 and shells 22 and 24 to maintain the tubes in position to further facilitate replacement. Lastly, outer shell 24 can have sufficient malleability to permit it to be easily popped back into its original shape as repair is being effected after a collision.

Figure 3:
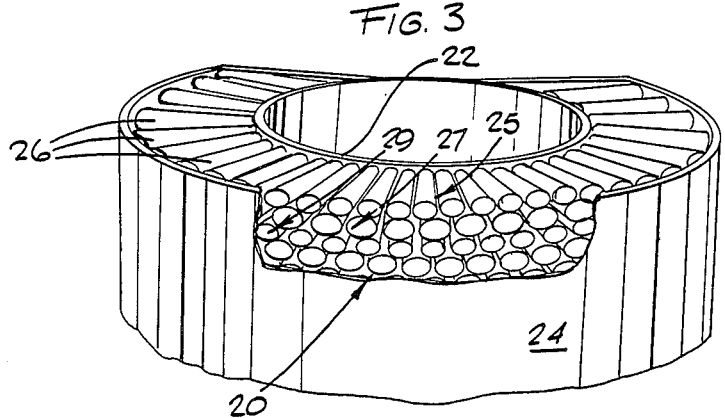
FIG. 3 is an enlarged perspective view of a second embodiment of the present invention with parts broken away.

A second embodiment of the bumper system 20 of the present invention is depicted in FIG. 3. In this embodiment, the crushable tubes 26 extend generally radially outwardly between inner shell 22 and outer shell 24. Intermediate row 27 between rows 25 and 29 may be offset as in the FIG. 1 embodiment and further, may be of a second smaller diameter to fill the gaps between the tubes 26 of rows 25 and 29. As the tubes extend generally radially outwardly, they will form spaces between their outer perimeters. By way of example, a 6" diameter tube extending outwardly two feet will have ⅝" between it and any of the four closest adjacent tubes. The interspersion of the smaller diameter tubes will significantly rigidify the structure of bumper 20. It is possible that the axial tubes of the FIG. 3 embodiment may produce too stable a structure to perform as a bumper, depending on the material selected to form the crushable tubes. In this case, the outer surfaces of tubes 26 could be scored to permit a set of preferred tearing lines to facilitate the axial crushing. This may be necessary to prevent the tubes from penetrating (spear-like) inner (22) and outer (24) shells upon collision.

In the FIG. 3 embodiment, again, by the way of example, the first plurality of tubes could have a diameter of 12 inches and a wall thickness of ⅜ inch and the second plurality an outside diameter of 5 inches and a wall thickness of ⅛ inch. When two diameters of tubes are used the ratio of the large diameter to small diameter tubes could be from about 1.5 to 6 and in no event should the ratio exceed 10. It will be appreciated that the dimensions specifically called out here are for purposes of example only, since the selection of actual dimensions cannot be done in an isolated manner outside the context of total system design as the particular design parameters of a given situation require.

Various changes, alternatives and modifications of these embodiments will become apparent to the person of ordinary skill in the art following a reading of the foregoing specification. Accordingly, it is intended that all such changes, alternatives and modifications as fall within the scope of the appended claims be considered part of the present invention.

I claim:

1. An energy-dissipation bumper system for protecting a portion of an outer periphery of a column of a tension leg platform, said bumper system comprising
a first inner cylindrical shell;
a second outer cylindrical shell surrounding said first cylindrical shell and being generally coaxial therewith;
a plurality of non-resilient, crushable, thin-walled tubular members lying between said first and said second cylindrical shells, said tubular members being constructed of tubular steel and having a diameter to wall thickness ratio of between about 30 and about 40, said tubular members having a sufficiently large radial extent to permit substantially all of the energy from an impact with said bumper system to be dissipated by absorption due primarily to collapse of said crushable thin-walled tubular members without damage to said first cylindrical shell.

2. The energy-dissipation bumper system of claim 1 wherein said crushable thin-walled tubular members extend generally radially outwardly from said first inner cylindrical shell.

3. The energy-dissipation bumper system of claim 1 wherein said crushable thin-walled tubular members extend generally axially about the periphery of said first cylindrical shell 4. The energy-dissipation bumper system of claim 3 wherein said axially-extending thin-walled crushable tubular members comprise a plurality of layers of said members surrounding at least a portion of said first cylindrical shell.

5. The energy-dissipation bumper system of claim 4 wherein one of said plurality of layers is offset circumferentially from at least one other of said layers.

6. The energy-dissipation bumper system of claim 1 wherein said crushable thin-walled tubular members encircle only a portion of a circumference of said tension leg platform column.

7. The energy-dissipation bumper system of claim 6 wherein said portion of said circumference of said column comprises generally from about five-eighths to about two-thirds of a circumferential periphery of said column.

8. The energy-dissipation bumper system of claim 7 wherein said portion of said column protected by said crushable thin-walled tubular members is limited in axial extent to a region immediately adjacent a normal water line.

9. The energy-dissipation bumper system of claim 8 wherein said axial region comprises a zone extending from about 20 feet below the minimum water line to a point 25 feet above said normal water line.

10. The energy-dissipation bumper system of claim 1 wherein each of said plurality of crushable, thin-walled tubular members has generally an outside diameter which is generally about the same.

11. The energy-dissipation bumper system of claim 1 wherein said plurality of crushable, thin-walled tubular members include a first group of crushable members having a first diameter and a second group of crushable members interspersed with said first group having a second smaller diameter.

12. The energy-dissipation bumper system of claim 11 wherein the ratio of said first diameter to said second diameter lies in the range of from about 1.5 to about 6.

13. An energy-dissipation bumper system for protecting a portion of an outer periphery of a column of a tension leg platform, said bumper system comprising a first inner cylindrical shell; a second inner cylindrical shell surrounding said first cylindrical shell and being generally coaxial therewith; a plurality of non-resilient, crushable, thin-walled tubular members lying between said first and said second cylindrical shells including a first group having a first diameter and a second group interspersed with said first group having a second smaller diameter, the ratio of said first diameter to said second diameter lying in the range from about 1.5 to about 6.0, said tubular members having a sufficiently large radial extent to permit substantially all of the energy from an impact with said bumper system to be dissipated by absorption due primarily to collapse of the crushable thin-walled tubular members without damage to said first cylindrical shell.

* * * * *